United States Patent [19]

Jensen

[11] Patent Number: 4,754,420
[45] Date of Patent: Jun. 28, 1988

[54] DIGITAL DATA FILTER FOR LOCAL AREA NETWORK

[75] Inventor: Gordon A. Jensen, Colorado Springs, Colo.

[73] Assignee: Hewlett-Packard Company, Palo Alto, Calif.

[21] Appl. No.: 798,055

[22] Filed: Nov. 14, 1985

[51] Int. Cl.⁴ .............................................. G06F 7/38
[52] U.S. Cl. .................................. 364/724; 340/146.2
[58] Field of Search ....................... 364/715, 724, 728; 340/146.2

[56] References Cited

U.S. PATENT DOCUMENTS

| | | | |
|---|---|---|---|
| 3,849,762 | 11/1974 | Fujimoto et al. | 340/146.2 |
| 3,881,101 | 4/1975 | Pederson et al. | 364/728 |
| 4,053,871 | 10/1977 | Vidalin et al. | 340/146.2 |
| 4,443,860 | 4/1984 | Vidalin | 340/146.2 |
| 4,524,427 | 6/1985 | Vidalin et al. | 340/146.2 |
| 4,525,803 | 6/1985 | Vidalin et al. | 340/146.2 |
| 4,575,864 | 3/1986 | Rice, Jr. et al. | 364/728 |

*Primary Examiner*—Gary V. Harkcom
*Assistant Examiner*—Tan V. Mai
*Attorney, Agent, or Firm*—Christopher J. Byrne

[57] ABSTRACT

An apparatus for digital filtering of sequences of data units, such as sequences of bytes. The apparatus uses parallel application of more than one filter and stores the results of applying all filters to a whole sequence of data units. The apparatus involves the interaction of random access memories. Hence, filters are programmable. In addition, individual data units in a sequence may be trapped for comparison solely as a function of their ordinal position in the sequence.

9 Claims, 12 Drawing Sheets

| PREAMBLE | DESTINATION | SOURCE | TYPE | DATA | FRAME CHECK |

*FIG 1*

DIGITAL DATA FILTER FOR LOCAL AREA NETWORK

This specification references a formerly co-pending application, Ser. No. 798,054, filed Nov. 14, 1985, which has since issued as U.S. Pat. No. 4,680,755.

BACKGROUND OF THE INVENTION

A common objective of digital design is the recognition of a given bit pattern or sequence in some bit stream or data sequence. Digital devices which perform such pattern recognition are known as "state machines". Such machines are designed to accept binary data sequences as input, and to produce a predetermined output if a given data sequence is included in the input. For instance, a state machine may be designed to "go-high" if it encounters the trigger sequence 10101010 within an input data sequence. Therefore, the input 0010101010111 would trigger the machine because the trigger sequence was included in the input data sequence. On the other hand, the input 0010101011111 would not trigger the machine because the requisite trigger was not present in the input data sequence. Such a state machine is therefore designed to recognize the trigger sequence. Techniques for the efficient design of such state machines and for constructing them with logic components and various types of flip-flop circuits are well known in electrical engineering. *Switching and Finite Automata Theory*, Part III, by Zvi Kohavi, (McGraw-Hill, 1978).

There is great need for the pattern recognition capability provided by state machines in modern digital equipment. One such important application involves so-called Local Area Networks (LAN). A LAN is a communication network that provides interconnection of a variety of data communicating devices within a small area. *Local Networks*, p. 2, by William Stallings (Macmillan Publishing Company, 1984).

A typical LAN is a computer network limited to a geographically small area such as a plant site or an office building. various devices, such as computers, terminals, etc. are "plugged into" the network at various locations on the network. Each device is assigned an address so that digital communications between devices on the network may be properly delivered and received. Obviously, each device must be able to recognize its own address, among other things, thus necessitating pattern recognition as discussed above.

A well known and commercially accepted LAN standard is encompassed by the Institute of Electrical and Electronic Engineers (IEEE) standard 802.3. This standard is well known in industry under the name "Ethernet." The IEEE 802.3 standard features a Carrier Sense Multiple Access with Collision Detection (CSMA/CD) media access method whereby two or more stations (devices) share a common bus transmission medium, typically a coaxial cable. To transmit over the LAN, a station or device waits for a quiet period on the bus, that is, no other station is transmitting, and then sends its intended message in bit serial form, at rates up to 10 Mbits/sec.

In the Ethernet or IEEE 802.3 system, messages between devices on the network travel in packets or frames on the bus. An Ethernet packet is displayed in FIG. 1. In examining the packet from head to tail, we see that it consists of a 64-bit preamble, a 48-bit destination address, a 48-bit source address, a 16-bit type field, a data field that may be from 46 bytes up to 1500 bytes long, wherein the last 4 bytes constitute 32-bit cyclic redundancy check or frame check sequence. This Ethernet message format establishes the standard required for widespread implementation of LAN technology.

An important segment of LAN technology involves data communications test equipment, commonly known as protocol analyzers. These devices are designed to monitor, as well as generate, traffic on the LAN or Ethernet transmission bus and then analyze it for the purposes of field service; electronic data processing center support; network component research, development, manufacture, installation and service; and general network troubleshooting.

Often, examination of the fields of Ethernet packets will be necessary. For instance, error analysis may require detection of all Ethernet packets in traffic which have certain parameters, for example, every fourth byte of the data field is a certain ASCII (American Standards Committee on Information Interchange) character. Thus, one may be interested in packets with data fields fitting a certain pattern.

As noted earlier, pattern recognition is the task of state machines. However, conventional state machines are often too awkward for the sort of rapid data recognition requirements of the latest Ethernet system protocol analyzers and similar systems. A major shortcoming is that while a given pattern may be spotted with a conventional state machine, changing the patterns to be recognized would require tedious redesign and reconstruction of the state machine. Such a limitation obviously makes efficient error analysis of Ethernet systems, for instance, nearly impossible. Also, trapping deep into the data field with a conventional state machine requires an excessive amount of hardware.

SUMMARY OF THE INVENTION

The present invention, referred to hereinafter in this specification as the deep trap machine or the deep trap, may be thought of as a super state machine which overcomes the limitations of conventional state machines, particularly with respect to the Ethernet systems described above, but with wide ranging applicability for beyond Ethernet. The deep trap machine performs complex pattern recognition, a process referred to as filtering in the specification, through a unique interaction of random access memories.

A sequence of bytes, such as the data field of an Ethernet packet, may be filtered by the deep trap machine for the purpose of determining the presence of one or more patterns in the byte sequence. These patterns are referred to as filters in the specification. The bytes of a sequence are pulled off a byte-wide transmission line, one byte at a time, and sent, one byte at a time, to the lower order address-select lines of a large random access memory, referred to in the specifications as the COMP RAM. Simultaneously with the pulling into the deep trap machine of each byte, a counter is incremented, thereby corresponding to each byte's ordinal position in the byte sequence. The output of the counter, after each increment, drives the address-select lines of a smaller random access memory, referred to in the specification as the COUNT RAM. The COUNT RAM likewise responds to each counter increment by outputting the word resident at the address corresponding to the current counter value. This COUNT RAM word then drives the upper order address-select lines of the COMP RAM at the same time that the proper byte drives the lower order address-select lines of the COMP RAM. Thus, each byte of the sequence, together with its corresponding COUNT RAM word, will access a particular word of the COMP RAM. This COMP RAM word may be thought of as a pattern of true-false values regarding a given byte's satisfaction of the patterns, that is, filters, sought to be recognized. This COMP RAM word is then output to a bank of "sticky-at-false" electronic latches which are set to true at the beginning of each new byte sequence. Hence, any byte of the sequence which fails to satisfy a particular filter will trip a latch from true to false, in which state the latch remains until the end of the byte sequence. Hence, at the end of the sequence, the latch values determine which filters were satisfied for that particular byte sequence.

Hence, the deep trap provides the following capabilities: (I) It is capable of looking, that is, filtering for, more than one pattern within a single data sequence and recording which filters are satisfied and which are not. (II) it is capable of achieving position dependence, that is "ignoring" large portions of data sequences and focusing, that is trapping, only on other pre-determined portions. For instance, suppose the pattern one is seeking to recognize requires examining only those bytes occupying certain pre-determined ordinal positions in the data field of an Ethernet packet, such as the bytes in positions 10, 20, and 30, while all other bytes in the packet are irrelevant to the pattern. The deep trap machine allows one to trap-on and compare only the critical bytes, essentially ignoring the rest. (III) It can check for proper data sequence length. (IV). The deep trap machine performs all these functions with high speed and efficiency. (V) Finally, the deep trap machine is programmable so that tedious state machine design is not required each time new filters are required. Thus, the deep trap achieves a power and flexibility unmatched by conventional state machines.

BRIEF DESCRIPTION OF THE DRAWINGS

FIG. 1 is a schematic diagram of an Ethernet packet.

DESCRIPTION OF THE PREFERRED EMBODIMENT

Generally, the deep trap machine implements a rapid data scheme wherein the address-select lines of a random memory (RAM) are driven by the data that is being For instance, a single 8-bit byte may manifest any one of 256 possible values. Hence, a 256×1 RAM may be used to recognize any given byte by loading a single true value in the RAM address corresponding to the value of the byte to be recognized and loading false values in all other addresses. The address-select lines of the RAM may then be driven by the data, that is, the bytes, being searched. Thus, only the target byte will access the address containing the single true value so that the output of the RAM will be true only when the target byte has been "recognized," while it will be false for all other inputs. For instance, if one seeks to recognize the byte FF (hex), then a true value in address 255 and false values in addresses 0 through 254 of the RAM is required. Hence, only the byte FF (hex) will produce a true output.

Obviously, numerical value represents only one parameter for which a byte may be examined. For instance, one may also check for other parameters such as whether a byte is even or odd. To check for even bytes, a 256×1 RAM would be loaded with true values at all even-numbered addresses and false values at all odd-numbered addresses. Driving the address-select lines of such a RAM with the bytes that are being searched would produce a true output only with the even bytes.

A single 256×1 RAM section is referred to as a "data-comparison-parameter" throughout the rest of the specification. However, different size data-comparison-parameters are possible, provided there exists a critical relationship between the data-comparison-parameter and the data-unit that drives it, such that for a data-unit n bits wide, the dimensions of its appropriate data-comparison-parameter is 2 raised to the nth power ×1. Hence, for byte wide data, 8-bits wide, the appropriate data-comparison-parameter has dimensions 2 raised to the nth power ×1=256×1.

Moreover, the number of data-comparison-parameters to be searched for per byte may vary. For example, using a 256×8 or a 256×16 RAM allows one to search for 8 or 16 data-comparison-parameters, respectively, in parallel per byte of input data. In addition, a vertical sequence of data-comparison-parameters, referred to as a "filter" in the specification, may be applied to a sequence of data-units.

Figure 2:
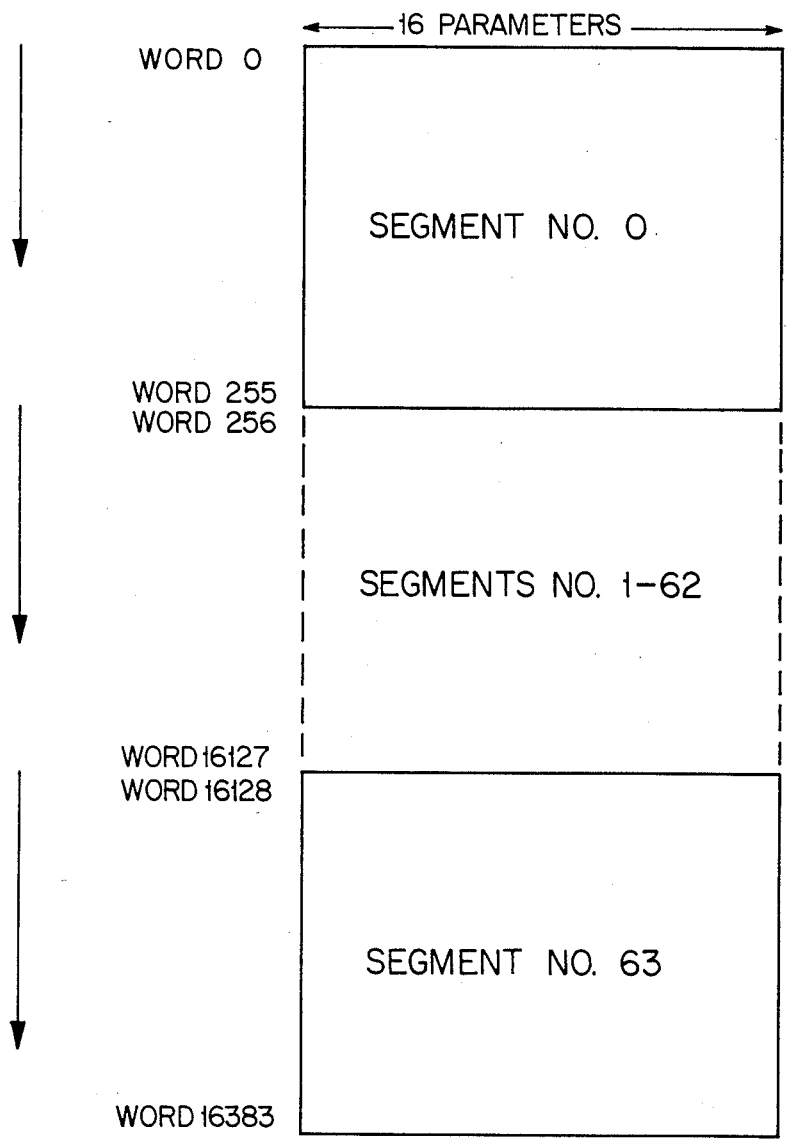
FIG. 2 is a schematic diagram of random access memory, as the COMP RAM.

The deep trap machine exploits the foregoing principles in its implementation of the so-called comparison RAM or COMP RAM. Moreover, in order to compare whole sequences of bytes, not just individual bytes, the COMP RAM is expanded in size. The preferred embodiment of the deep trap machine uses a 16K×16 COMP RAM, providing for 16384 16-bit words as shown in FIG. 2.

To accommodate the comparison of sequences of bytes, such as in the data field of an Ethernet packet, the upper-order address-select lines of such a RAM are driven by the output of a binary counter, which is clocked to increment after each byte of input, while the lower-order address-select lines are still driven by the individual bytes. The counter increments are designed to represent the ordinal position of a byte in a sequence of bytes. Since the counter is incremented after each byte of input, referred to as a compare cycle, the COMP RAM is accessed in segments of 256 16-bit words per byte. Therefore, the COMP RAM may be logically partitioned into 64 segments of 256 words per segment, with each segment being 16 256×1 data-comparison-parameters wide, wherein each segment houses data-comparison-parameters applicable to a single byte.

Moreover, the sequencing of segments naturally allows for the sequencing of data-comparison-parameters. In the preferred embodiment of the deep trap machine, a sequence of such data-comparison-parameters, that is, a column of 256×1 data-comparison-parameters, is known as a "filter," where a single filter is applicable to a whole sequence of bytes, such as the data field of an Ethernet packet. In the terminology of the present invention, the 16K×16 organization of the COMP RAM theoretically allows for the parallel application of 16 filters to a single sequence of bytes wherein each filter may be up to 64 data-comparison-parameters long. This means that, theoretically, in "filtering" the data field of a single Ethernet packet, one could look for 16 different byte-patterns simultaneously wherein each filter may be up to 64 bytes long. (In the preferred embodiment of the present invention, however, maximum filter length is 62 bytes since two segments of the COMP RAM are reserved for special purposes, as described below.)

Figure 3:
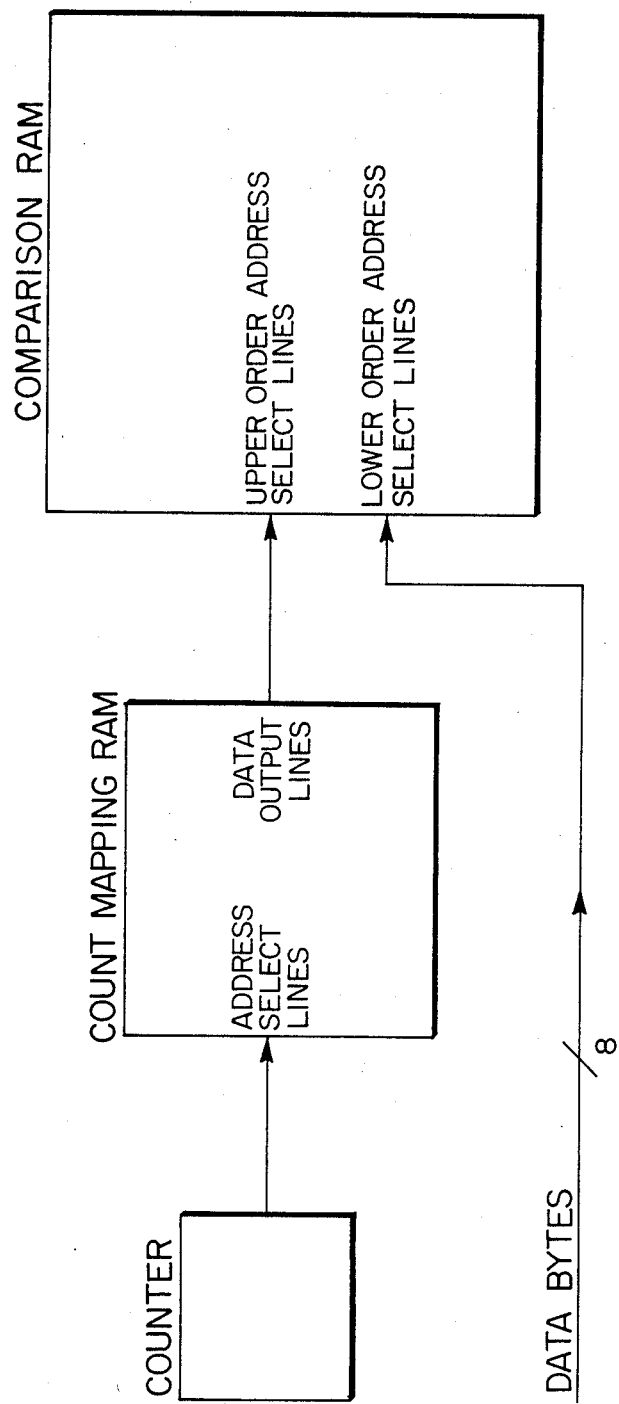
FIG. 3 is a schematic diagram of a data-plus-memory-map driven random access memory.

The preferred embodiment of the present invention further increases the power of the deep trap machine by use of a second RAM, known as a COUNT RAM. The output of the counter drives the COUNT RAM, while the output of the COUNT RAM drives the upper address-select lines of the COMP RAM, as shown in FIG. 3. The COUNT RAM serves to map the actual count, representing the ordinal position of a byte in a sequence of bytes, into a logical count, which serves as an address pointer to appropriate segments of the COMP RAM. For instance, a 2K×8 COUNT RAM has the capacity to map 2048 actual count values into 256 logical values. Since the maximum size of an Ethernet packet data field is 1514 bytes, this provides more than enough count values to handle Ethernet packets. Moreover, since the COMP RAM is configured to provide, at most, 64 segments of data-comparison-parameters, the 256 COUNT RAM logical values are similarly more than adequate.

Figure 4:
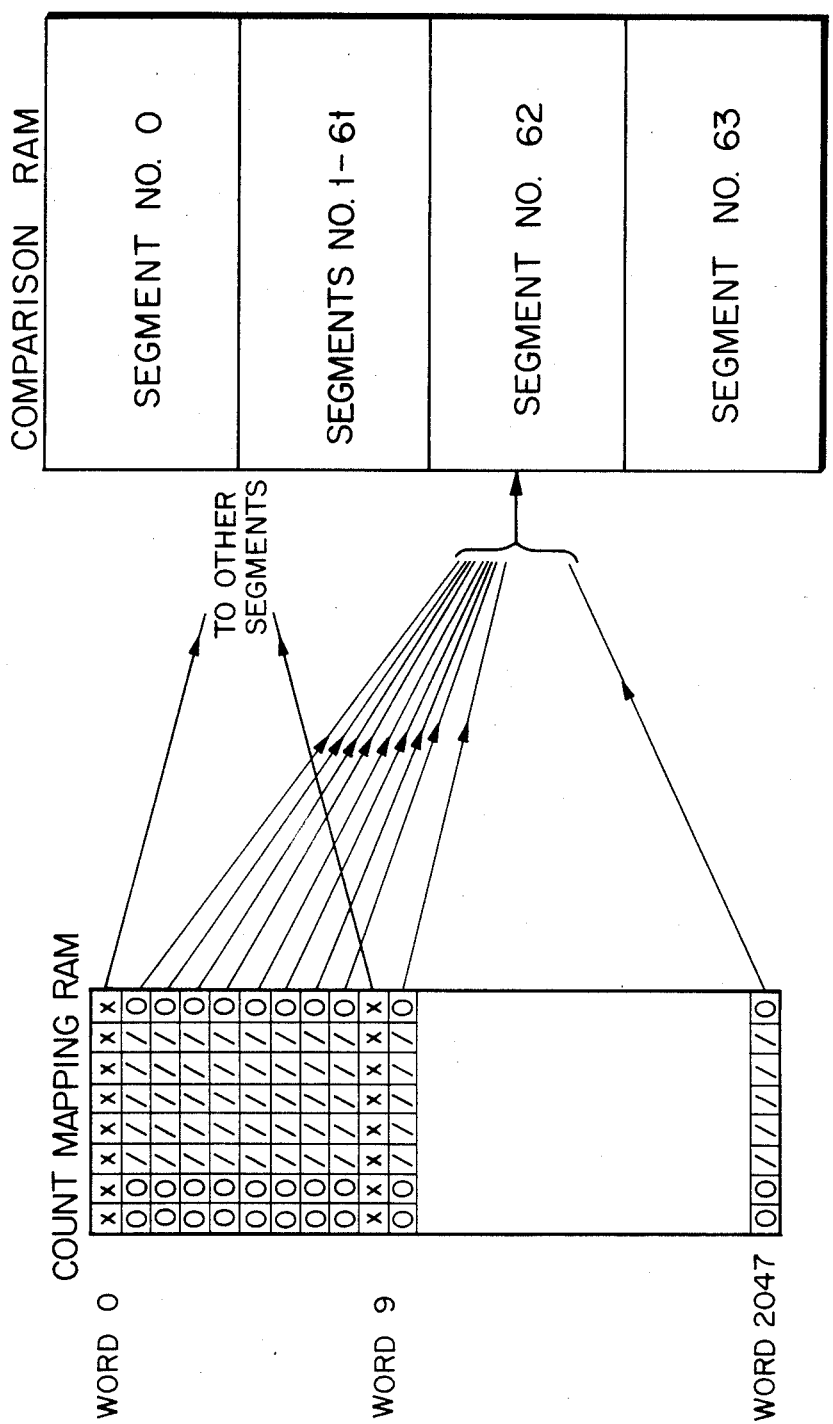
FIG. 4 is a schematic diagram of a memory-mapping system.

The interaction of the COUNT RAM and COMP RAM is perhaps best illustrated in exercising the position-dependence capability of the deep trap machine. Position-dependence involves "trapping" only those bytes occupying certain positions in a data-sequence of bytes, while "ignoring" all other bytes in the data-sequence as "don't-care" quantities. For instance, only bytes occupying the first and tenth positions of a data-sequence may be of interest, as shown in FIG. 4. In the preferred embodiment, all bytes but the first and tenth may be "ignored" by loading a single segment of the COMP RAM with don't-care, that is, all true values. At the same time, the COUNT RAM is loaded with pointers, that is, logical counts, to the don't-care segment of the COMP RAM at the COUNT RAM addresses corresponding to the positions of the don't-care bytes in the data-sequence. Likewise, in order to "trap" and compare the first and tenth bytes with data-comparison-parameters, the first and tenth addresses of the COUNT RAM are each loaded with pointers to the appropriate segments of the COMP RAM containing the data-comparison-parameters applicable to the "trapped" bytes.

The preferred embodiment also requires that the length in bytes of each data-sequence be checked as a final comparison cycle. This is required because the preferred embodiment implements a true-until-proven-false scheme to record which filters are satisfied per data-sequence. Without a final check for sequence length, the deep trap machine may produce erroneous output: a particular sequence may satisfy an initial portion of a given pattern, for example, the first few bytes of a filter, and then end. Hence, there would not be a complete match but the output of the deep trap machine would be true under the true-until-proven-false scheme. A final comparison cycle to check for adequate sequence length solves this problem. In the preferred embodiment, the solution is implemented by doubling the size of the COUNT RAM and adding a multiplexor interface between the COUNT RAM and the COMP RAM to select between "normal" and length-check comparison.

During "normal" comparisons, one half of the COUNT RAM drives the upper address-select lines of the COMP RAM as previously discussed. Following receipt of the last byte of a sequence, an end-of-sequence signal, generated by a separate device (disclosed in formerly co-pending application of REAMES, entitled "Real-Time End of Packet Signal Generator" Ser. No. 798,054, filed Nov. 14, 1985, which has since issued as U.S. Pat. No. 4,680,755), triggers a final comparison cycle for that sequence: a test for minimum length necessary to satisfy each filter. During this last cycle, the other half of the COUNT RAM drives the lower five address-select lines of the COMP RAM while all other COMP RAM address lines are pulled high, thus accessing the sixty-fourth, that is, the last, segment of the COMP RAM. The five lines driven by the COUNT RAM during this length check cycle point to one of seventeen words which contain length-check information. If the received data-sequence is too short to satisfy any of the filters, then the word containing all false values is addressed. If the sequence is long enough to satisfy all filters, then the word containing all true values is addressed. Likewise, if the sequence satisfies the length criterion for some of the filters, then one of the other fifteen words is accessed, containing the proper mix of true/false values, previously loaded by a microprocessor.

Figure 5:
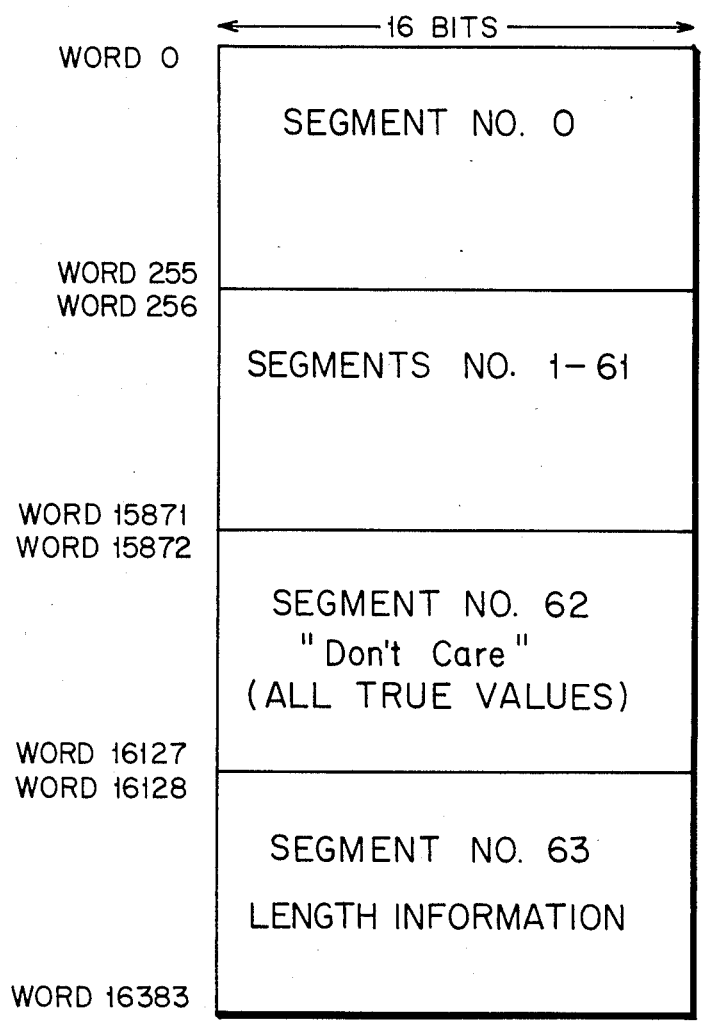
FIG. 5 is a more detailed schematic diagram of a random access memory, known as the COMP RAM.

At this point it should be noted that only two of the COMP RAM's sixty-four segments have dedicated uses as shown in FIG. 5. Just one segment is dedicated to don't-care values and just one other to length-check information. In the preferred embodiment, the highest segment, the sixty-fourth (#63), contains length-check information; the next highest, the sixty-third (#62), houses don't-care, that is, all true, values; the remaining segments, #0 through #61, are therefore free to hold the sixteen filters, each of which may be up to sixty-two bytes, that is, sixty-two segments, long.

Finally, the results of "filtering" each data-sequence must be recorded. This is accomplished by connecting the sixteen data-output lines of the COMP RAM, one for each filter, to sixteen electronic latches, one for each output line. Prior to each data-sequence, each of the latches is initialized to true. The latches are designed to be "sticky-at-false" so that only a false input to a latch will flip it from true to false in which state it will remain until it is externally reset to true. Such latches are implemented with J-K:NOT (J-$\overline{\text{K}}$) flip flop circuits in the preferred embodiment.

During filtering of the data-sequences, the COMP RAM procedures output following each compare cycle, that is, following each byte of the data-sequence and after the length-check cycle. Hence, any byte of a sequence which does not match a filter segment and any sequence which is too short to satisfy a single filter will trigger false ouput which will in turn flip the appropriate latches from true to false, thus recording which filters are satisfied and which are not.

In the preferred embodiment, the results of a filtered data-sequence are transferred, in the form of a 16-bit word, from the latches to a first-in-first-out (FIFO) storage buffer; the latches are reset to true; the counter for the COUNT RAM is reset to zero; and the deep trap machine is then ready for the next data-sequence.

It must be noted that although the preferred embodiment of the present invention presumes that individual data-units of memory data-sequences will be byte wide, that is, 8 bits per data-unit, the present invention may be adjusted by design to accommodate any bit-width data-unit. Such adjustment need only maintain certain critical relationships between components of the present invention.

First, it is necessary that the relationship between the bit-width of a data-unit and a single data-comparison-parameter section of COMP RAM (and therefore a single segment of COMP RAM) be such that the number of RAM addresses applicable to a single data-unit be equal to the number two raised to an exponent equal to the number of bits in the data-unit as explained at the outset of the specification. Hence, for a 1-bit data-unit, a 2×1 data-comparison-parameter is required; for a 2-bit data-unit, a 4×1 data-comparison-parameter is required; for a 3-bit dat an 8×1 data-comparison-parameter is required, and so on. Thus, for a byte-wide, that is, 8-bit data-unit, a 256×1 data-comparison-parameter is required.

In addition, it is not necessary that a single segment of COMP RAM be 16 data-comparison-parameters wide. It may be a different width as the designer requires. The only constraint is that the number of COMP RAM output latches must be equal to the data-comparison-parameter width of a COMP RAM segment, that is, one latch per filter.

Likewise, it is not necessary to constrain the COMP RAM to sixty-four data-comparison-parameters in length, equivalent to sixty-four segments of data-comparison-parameters. The COMP RAM could be a different size. However, at least one segment must be devoted to "don't-care," that is, all true, values if position dependence is desired and at least one other must be devoted to length-check information if data sequence lengths are variable.

In addition, the size of the COUNT RAM, used to memory-map individual data-units onto specific segments of the COMP RAM, is not limited to the 4K×8 dimensions of the preferred embodiment. It may also differ in size but it must have at least as many words, that is, addresses, as the number of data-units in the largest possible data-sequence expected to be processed plus additional addresses to accommodate the length-check cycle, as explained below. Likewise, each word of the COUNT RAM must have at least enough bits to represent a number equal to the number of segments of data-comparison-parameters in the COMP RAM. In the preferred embodiment, a 4K×8 COUNT RAM was used because it was intended to accommodate Ethernet data-sequences, which are at most 1514 data-units long, and because there are 64 segments in the COMP RAM.

Also, the proper COUNTER and COMP RAM sizes, though not fixed, are critical to the data-sequence length-check cycle. In the preferred embodiment, during "normal" data-unit comparisons, the upper half of the COUNT RAM drives the address-select lines of the COMP RAM. Thus, one half of the COUNT RAM has at least as many words, that is, addresses, as the number of data-units in the largest possible data-sequence expected, which is 1514 bytes in Ethernet systems. On the other hand, during the final length-check cycle, the lower half of the COUNT RAM drives the lower five address lines of the COMP RAM, accessing length-check information words, while the remaining COMP RAM address-select lines are pulled high by the multiplexer which interfaces between the COUNT RAM and the COMP RAM. Hence, the COUNTER which drives the COUNT RAM must be large enough to count to the highest possible ordinal positions of data-units in incoming data-sequences. At a minimum, the COUNTER must have enough bits to represent a number as large as the highest address in the COUNT RAM, divided by two.

It should also be noted that the sticky-at-false latches can be implemented in ways other than the J-$\overline{\text{K}}$ flip-flop circuits of the preferred embodiment. It is simply required that a fast latch have the sticky-at-false property.

Figure 6:
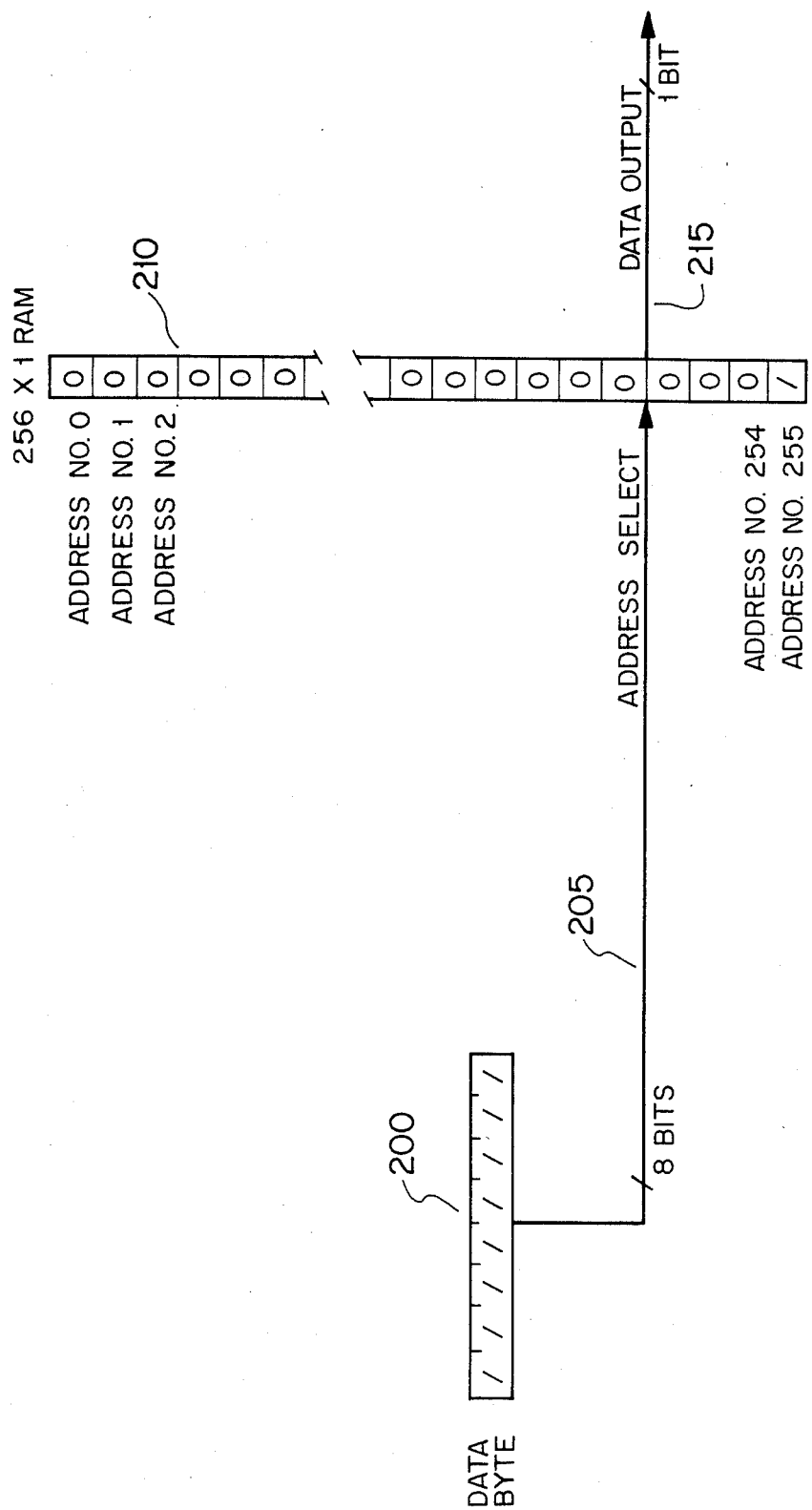
FIG. 6 is a schematic diagram of a data-driven random access memory.

Principles leading to full implementation of a complete deep trap are now discussed in reference to figures. In FIG. 6, reference numeral 200 designates a data byte to be delivered in parallel to the eight address-select lines of a 256×1 random access memory (RAM) 210 via channel 205. The lowest order bit of the byte drives the lowest order address-select line, the next-to-lowest order bit drives the next-to-lowest order address-select line, and so on until each bit of the byte is matched with its respective order address-select line.

The 256×1 RAM may be used to "recognize" a given byte by loading a single true value in the address corresponding to the value of the byte to be recognized and false values in the remaining two-hundred-and-fifty-five addresses. For the sake of example, we assume that a "1" represents a true value and a "0" represents a false value, although the reverse convention, if consistently applied, would be equivalent. Then, by driving the address-select lines of the RAM with the data-units, that is, bytes, to be examined, the RAM will output a true value over data-output line 215 only when the target byte appears and it will ouput false values at all other times. In FIG. 6, this principle is illustrated by placing a true value in address 255 and false values in addresses #0 through #254. Hence, only a byte consisting of all 1's will trigger a true output from RAM 210, essentially signalling that the target byte was recognized. In the terminology of the preferred embodiment, a single 256×1 section of RAM is referred to as a data-comparison-parameter.

Figure 7:
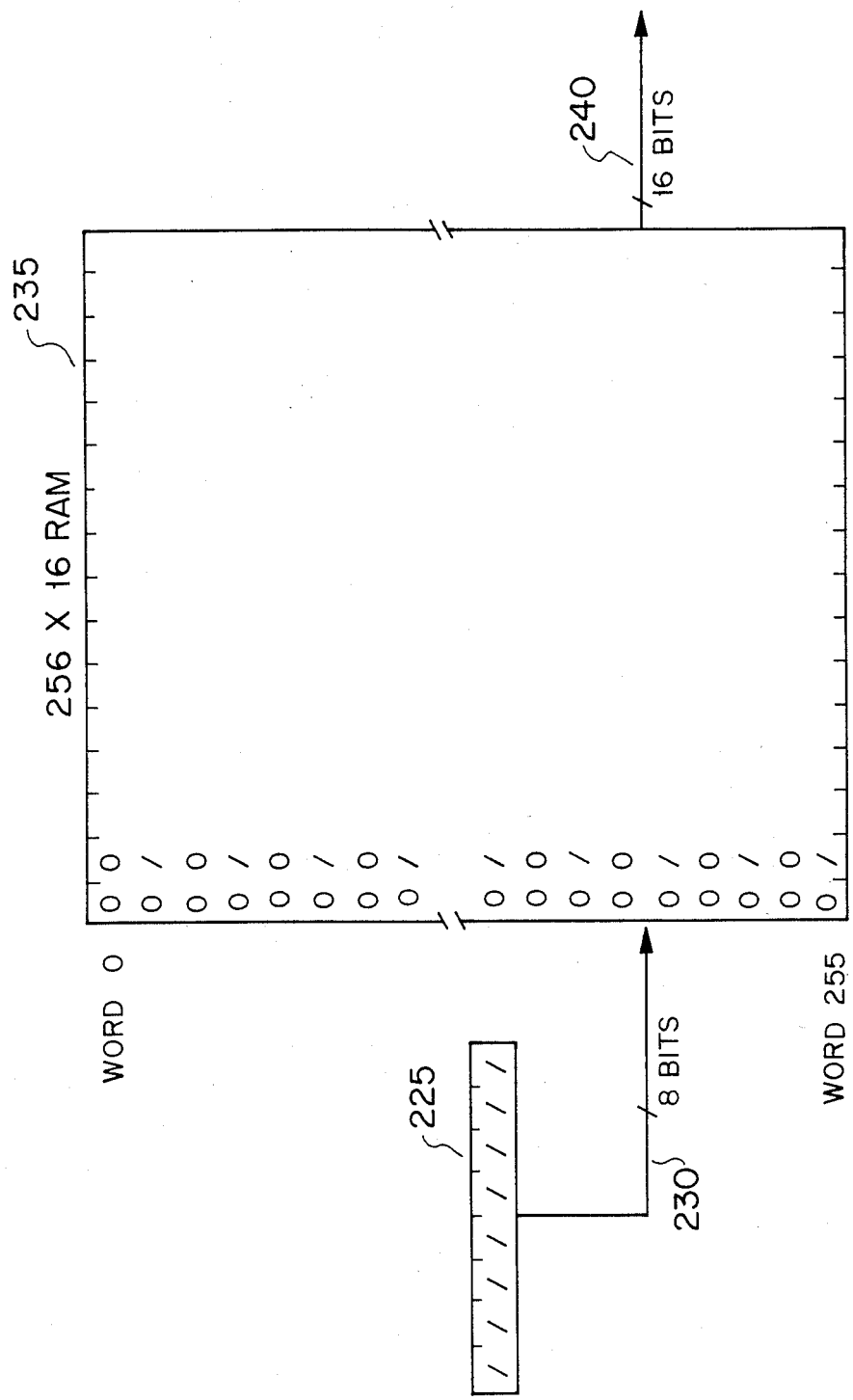
FIG. 7 is a more detailed schematic diagram of a data-driven random access memory.

In FIG. 7, a 256×16 RAM 235 is shown, illustrating that more than one data-comparison-parameter may be applied to a single data-unit. In this configuration, 16 data-comparison-parameters may be applied in parallel to a single data-unit. Here again, data-unit, that is, byte, 225 is delivered via data-input lines 230 to the address-select lines of RAM 235. In RAM 235, each of the 16 256×1 logical sections of RAM represent a single data-comparison-parameter, all sixteen to be applied in parallel to each incoming byte, as noted. For instance, to check for a specific byte value as well as whether bytes are even or odd, a true value is inserted in the address corresponding to the desired numerical values and false values in the remaining addresses of the first 256×1 data-comparison-parameter, while true values are inserted in all the odd-numbered addresses and false values in all the even-numbered addresses of the next data-comparison-parameter. Likewise, additional parameters may be searched for, per-byte, by appropriately loading the remaining 14 data-comparison-parameters with appropriate true/false values. Again, for the sake of example, we assume that a "1" respresents a true value and a "0" a false value, although the reverse convention, if consistently applied, would be equivalent.

As noted previously, a data-unit such as byte 225 then drives the address-select lines of the 256×16 RAM inducing a 16-bit word output over data output lines 240 wherein each bit of the 16-bit word output corresponds to a single data-comparison-parameter. Hence, the 16-bit pattern of true/false values for each 16-bit word output of RAM 235 indicates which data-comparison-parameters were satisfied for a single byte of input.

Figure 8:
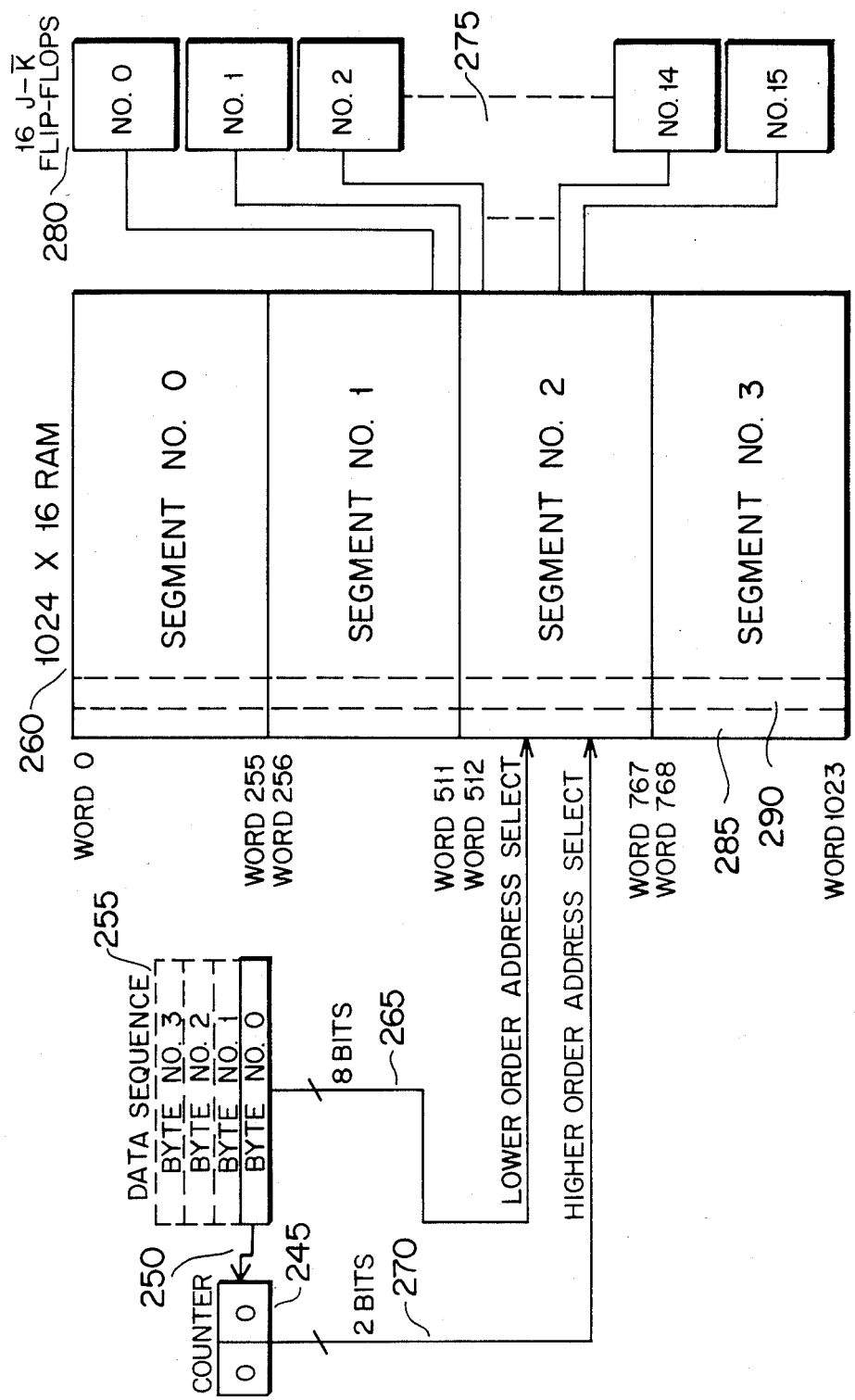
FIG. 8 is a schematic diagram of a data-plus-counter driven random access memory.

In FIG. 8, further generalization is realized to accommodate comparing sequences of bytes. Data-units, that is, bytes of data-sequence 255, plus the output of counter 245 are used to drive the lower-order address-select lines of 265 and the upper-order address-select lines 270, respectively, of RAM 260, known as the COMP RAM. Counter 245 is clocked via means 250 to increment by one with the arrival of each new byte in data-sequence 255. Hence, each data-unit, that is, byte, of data-sequence 255 thereby accesses a different segment of COMP RAM 260. Byte #0 will access segment #0 and be compared with data-comparison-parameters in segment #0; and so on for each byte of the data-sequence.

Likewise, the simultaneous arrival of a byte and its respective count value at the address-select lines of COMP RAM 260 will induce a 16-bit word output from COMP RAM 260 for each byte of input wherein the 16-bit word output indicates which data-comparison-parameters were satisfied for each byte of the sequence. The 16-bit word output travels over channel 275 in parallel to bank 280 consisting of 16 J-$\overline{K}$ flip-flops, one J-$\overline{K}$ flip-flop for each bit position of the output word.

The 16 J-$\overline{K}$ flip-flops are initially set to true at the start of an incoming data-sequence. The J-$\overline{K}$ flip-flops are designed so that once set to true, they will flip to false only upon false input and remain in a false state until externally reset to true. Hence, only false bits in the 16-bit word output of the RAM will flip their respective J-$\overline{K}$ flip-flops to false.

Each bit of such an output word represents the results of comparing a single byte of a data-sequence with a single data-comparison-parameter of COMP RAM 260. Likewise, each 16-bit output word respresents the results of comparing a single byte of a data-sequence with a single segment, that is, 256×16 section, of RAM 260. Finally, each 16-bit output word, one for each byte of the data-sequence, is applied in parallel to the bank 280 of J-$\overline{K}$ flip-flops. As explained above, false bits in any output words will flip their respective J-$\overline{K}$ flops from true to false and such flip-flops will remain in the false state until they are externally reset to true prior to a new data-sequence. Hence, at the end of a data-sequence, the bank 280 of 16 J-$\overline{K}$ flip-flops will hold a pattern of true/false values which represent the results of comparing the whole data-sequence with the entire COMP RAM 260 system of 16 parallel vertical sequences of data-comparison-parameters, that is, the 16 filters.

Two such filters, 285 and 290, are marked on FIG. 8. Hence, RAM 260 holds 16 filters and there is one J-$\overline{K}$ flip-flop per filter. Each J-$\overline{K}$ flip-flop, therefore, ultimately holds the results of comparing an entire data-sequence of bytes with a single filter.

Figure 9:
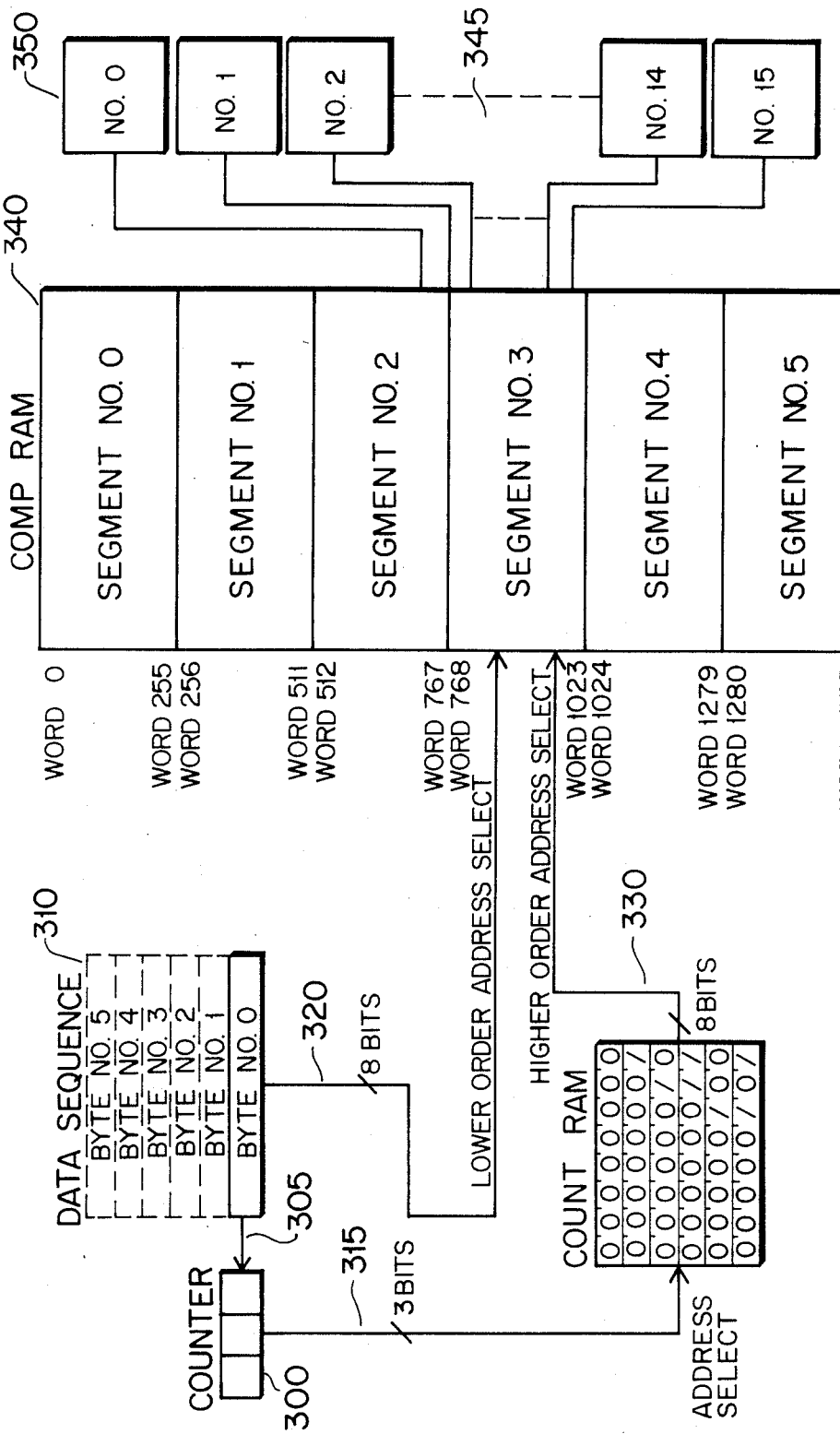
FIG. 9 is a schematic diagram of a data-plus-memory-map driven random access memory.

In FIG. 9, further generalization is realized to accommodate memory-mapping of particular bytes of a data-sequence onto particular segments of the COMP RAM. As discussed above, data-units, that is, bytes, of data-sequence 310 are used to drive the lower-order address-select lines 320 of COMP RAM 340. At the same time, counter 300 is clocked via means 305 to increment by one with each byte of data-sequence 310. The output of counter 300 then drives the address-select lines 315 of COUNT RAM 325. In response to the counter-value inputs, COUNT RAM 325 outputs words which drive the higher-order address-select lines of COMP RAM 340. The system is clocked so that COUNTER 300 counter-values correspond to the ordinal position (in data-sequence 310) of the byte driving the lower-order address-select lines 320 of COMP RAM 340. Hence, a byte of data-sequence 310 and its respective counter-value driven COUNT RAM word arrive simultaneously at the lower-order and higher-order address-select lines, respectively, of COMP RAM 340. Hence, the COUNT RAM words serve as pointers to particular segments of COMP RAM 340 while the bytes of data-sequence 310 serve as pointers to particular words within those segments.

In summary, counter 300 is clocked to output counter-values corresponding to the ordinal position of data-units, that is, bytes, in data-sequence 310. The counter-values likewise correspond to addresses in COUNT RAM 325. At each such address is a word which points to a particular segment of COMP RAM 340, depending upon which byte in data-sequence 310 is currently being processed. In the case of FIG. 9, for example, we see, based on the words in COUNT RAM 325, that byte #0 of data-sequence 310 is mapped onto segment #0 of COMP RAM 340; byte #1 is mapped onto segment #1; byte #2 is mapped onto segment #2; and so on. Finally, as discussed previously, each byte of data-sequence 310, together with its respective COUNT RAM word, will induce a 16-bit COMP RAM word to be output and delivered via data-output lines 345 to the 16 J-$\overline{K}$ flip-flops of bank 350.

Figure 10:
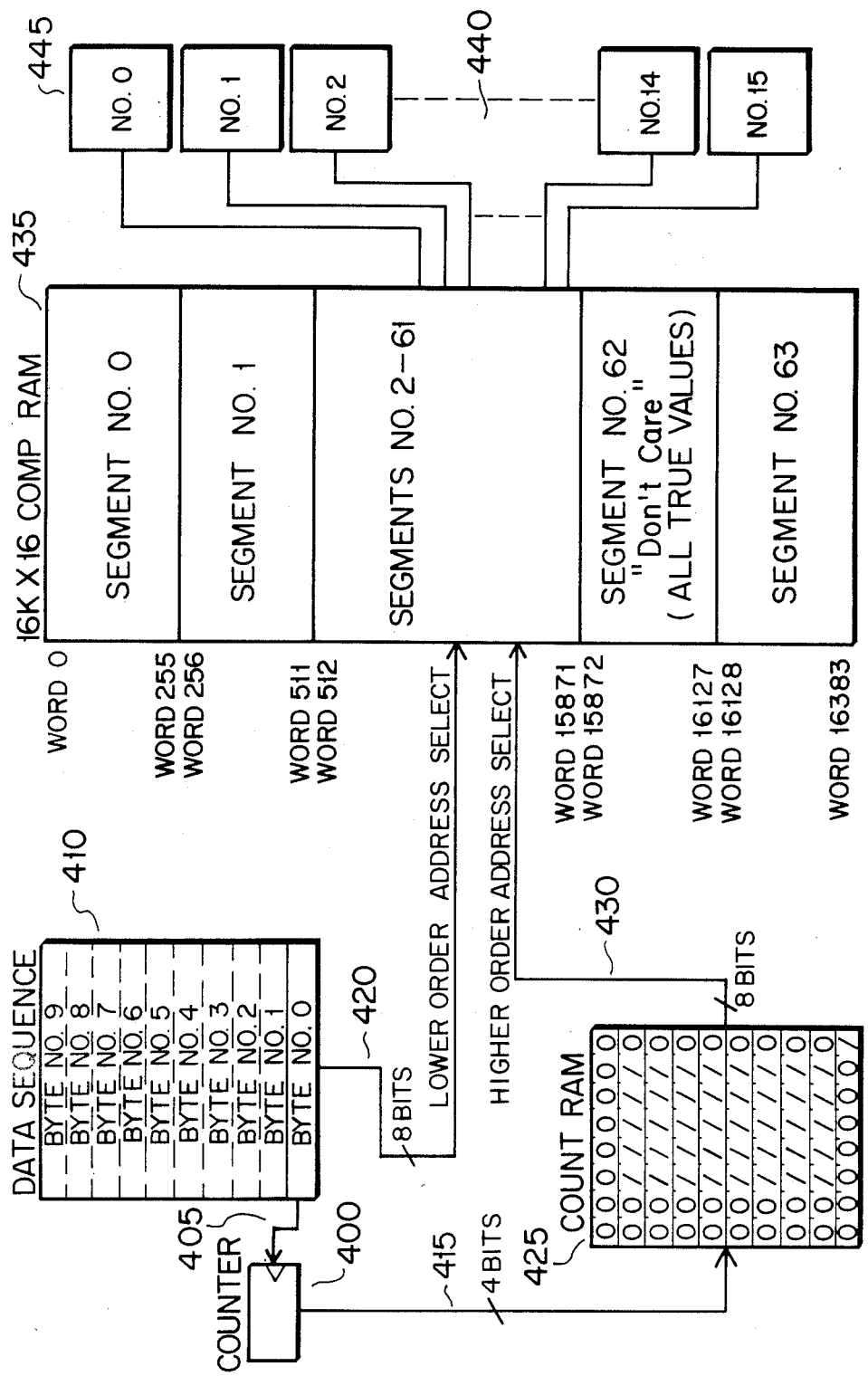
FIG. 10 is a schematic diagram of a data-plus-memory-map driven random access memory showing the position dependence feature of the present invention.

In FIG. 10, further generalization is realized to provide for the ability to effectively ignore any portions of a data-sequence while focusing on the remainder. As discussed, a primary purpose of the present invention is recognition and/or comparison of whole data-sequences, but not every data-unit, that is, byte, of a data-sequence may need to be examined in most cases. For example, only the bytes occupying certain ordinal positions in a data-sequence may be of interest, while the remaining bytes in the sequence may be ignored as don't-care quantities, as was mentioned in the discussion of the so-called position-dependence feature of the present invention.

Position-dependence is achieved in the manner demonstrated in FIG. 10. In FIG. 10, as in FIG. 9, a memory mapping scheme is realized. Data-units, that is, bytes, of data-sequence 410 drive the lower-order address-select lines of COMP RAM 435. In addition, counter 400 is clocked via means 405 to increment by one with each byte of data-sequence 410. The output of counter 400 then drives the address-select lines 415 of COUNT RAM 425. Pursuant to these counter-value inputs, COUNT RAM 425 outputs words, resident at the accessed addresses, which drive the higher-order address-select lines 430 of COMP RAM 435. Hence, a byte of data-sequence 410 and its respective counter-value driven COUNT RAM word arrive simultaneously at the lower-order and higher-order address-select lines, respectively, of COMP RAM 435. Hence, the COUNT RAM words serve as pointers to particular segments of the COMP RAM while the bytes of data-sequence 410 serve as pointers to particular words within those segments.

Therefore, COUNTER 400 is clocked to output counter-values corresponding to the ordinal position of data-units in data-sequence 410. The counter-values likewise correspond to addresses in COUNT RAM 425. At each such address is a word which points to a particular segment of COMP RAM 435, depending upon which byte in data-sequence 410 is currently being processed. Also, as in the case of FIG. 9, note in FIG. 10 that each byte of data-sequence 410, together with its respective COUNT RAM word, will induce a 16-bit COMP RAM word to be output via data-output lines 440 to the 16 J-$\overline{K}$ flip-flops of bank 445.

As noted above, however, not all the bytes of a data-sequence may be of interest. Suppose, for example, that only the first and tenth bytes of a data-sequence were of interest while the remaining bytes constituted don't-care quantities. All bytes, except for the first and tenth, may then be "ignored." This may be accomplished in the manner demonstrated in FIG. 10, where bytes #0 and #9 are of interest, while bytes #1 through #8 are to be ignored as don't-care quantities.

Note that one segment of COMP RAM 435, segment #62, is loaded with all true values. (For the sake of example, we assume that a "1" represents a true value an a "0" represents a false value, although the reverse convention, if consistently applied, would be equivalent.) As discussed above, the present invention implements a true-until-proven-false scheme wherein the J-$\overline{K}$ flip-flops are all initially set to true. The J-$\overline{K}$ flip-flop circuits are designed so that once set to true, only a false input will cause them to flip to a false state in which state they remain until externally reset to true. Hence, whatever states the J-$\overline{K}$'s are in will be unaffected by inputs consisting only of true values, such as the words of segment #62 of COMP RAM 435. In the terminology of the present invention, segment #62 is known as the "don't-care" segment.

Hence, as shown in FIG. 10, bytes #1 through #8 in data-sequence 410 may be ignored as don't-care quantities by loading COUNT RAM 425, at addresses corresponding to ordinal positions of the "don't-care" bytes in data-sequence 410, with words pointing to the "don't-care segment, #62, of COMP RAM 435. Hence, all "don't-care" bytes in data-sequence 410 will induce COMP RAM output words from the "don't-care" segment consisting of all true values, thereby unaffecting the state of the J-$\overline{K}$ flip flops.

Likewise, the bytes of interest, bytes #0 and #9 in our example, can be mapped onto other segments of the COMP RAM by loading the COUNT RAM at addresses corresponding to their ordinal positions with words pointing to other segments. For the sake of example, in FIG. 10, byte #0 is mapped onto segment #0 of the COMP RAM and byte #9 is mapped onto segment #1.

Hence, the bytes of interest, #0 and #9 in FIG. 10, are mapped onto segments of the COMP RAM containing the appropriate data-comparison-parameters. Meanwhile, the remaining don't-care bytes, #1 through #8, are mapped onto the don't-care segment containing all true values.

Finally, because the preferred embodiment employs a true-until-proven-false scheme, the possibility of erroneous output considered. This could occur in the case where a data-sequence satisfies the first few segments of a COMP RAM filter and then ends. Hence, the output of the trap machine would be true but the data-sequence would be too short. The preferred embodiment solves this problem by performing a final comparison cycle to check for proper data-sequence length.

Figure 11:
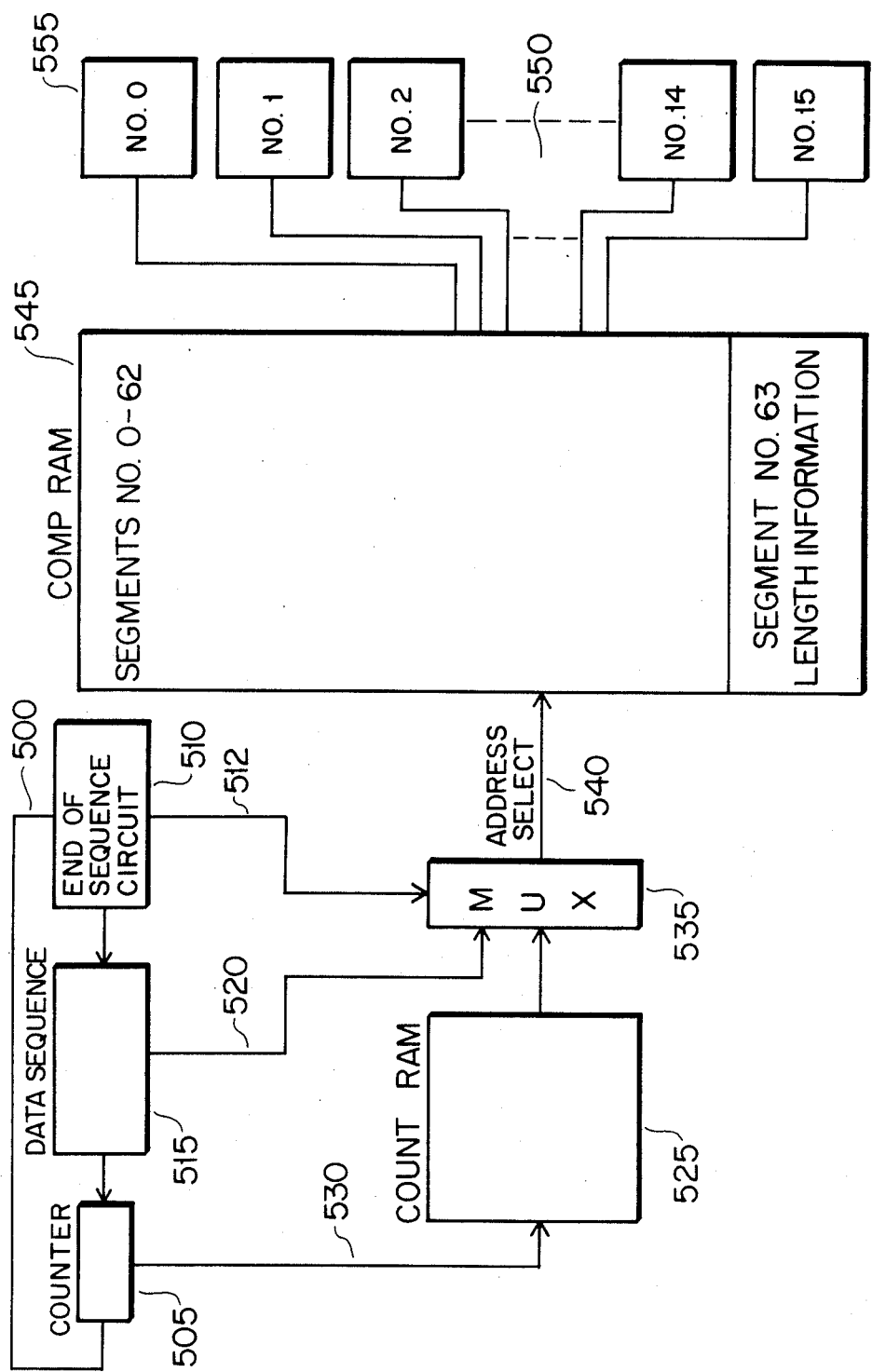
FIG. 11 is a schematic diagram of a data-plus-memory-map driven random access memory showing the data-sequence length-check feature of the present invention.

In FIG. 11, further generalization is realized to accomodate the final comparison cycle to check for proper data-sequence length. After passage of the last byte of data-sequence 515, end-of-sequence signal, generated by separate device 510 (disclosed in formerly co-pending application REAMES, entitled "Real-Time End of Packet Signal Generator" Ser. No. 798,054, filed Nov. 14, 1985, which has since issued as U.S. Pat. No. 4,680,755), is delivered to counter 505 and multiplexer (MUX) 535 via channels 500 and 512, respectively.

Prior to generation of this end-of-sequence signal, the system in FIG. 11 operates in a manner identical to the system of FIG. 10. In response to the end-of-sequence signal, however, the lower-five address-select lines of COMP RAM 545 are driven by words derived solely from the lower half of COUNT RAM 525. Simultaneously, the remaining address-select lines are pulled high by multiplexer 535, thereby accessing solely the highest, that is, the sixty-fourth, segment of the COMP RAM. Note that the bits of counter 505 will represent a number equal to the length in data-units, that is, bytes, of data-sequence 515, prior to resetting of the COUNTER. Hence, based on this number, certain predetermined COUNT RAM address-select lines will be driven so that a COUNT RAM word appropriate to the particular length number will be accessed.

This COUNT RAM word then drives the lower-five address-select lines. The five address-select lines now driven by the COUNT RAM will point to one of seventeen (17=$n$+1, where n=number of filters) addresses in the sixty-fourth segment of the COMP RAM, containing 16-bit words holding length information. If the received data-sequence 515 is too short to satisfy any of the filters, then the word consisting of all false values is accessed. If the received data-sequence is long enough to satisfy all filters, then the word consisting of all true values is accessed. If the data-sequence satisfies the length criterion for some but not all of the filters, then one of the other 15 words is accessed, representing a pattern of true/false values, previously loaded by a microprocessor, corresponding to which filters are satisfied. (Again, in FIG. 11, we assume that a "1" represents a true value and a "0" represents a false value although the reverse convention, if consistently applied, would be equivalent.)

The appropriate COMP RAM length-check word, thus accessed, is then output via channel 550 to the 16 J-$\overline{K}$ flip-flops of bank 555. This word represents the final comparison cycle for data-sequence 515. Any false bits in the word will flip their respective J-$\overline{K}$ flip-flop, provided the flip-flop was not already flipped during a previous byte-comparison cycle. Finally, at this point in time, the J-$\overline{K}$ flip-flops of bank 555 hold a 16-bit pattern of true/false values representing the results of filtering data-sequence 515. Each true bit, that is, J-$\overline{K}$ flip-flop, indicates that its respective filter was satisfied by data-sequence 515 while each false bit indicates that its respective filter was not satisfied by data-sequence 515. Hence, this 16-bit word, held by the 16 J-$\overline{\text{K}}$ flip-flops of bank 555, finally represents the results of filtering data-sequence 515. This bit result may now be latched from bank 555 and delivered to other devices for use.

Figure 12:
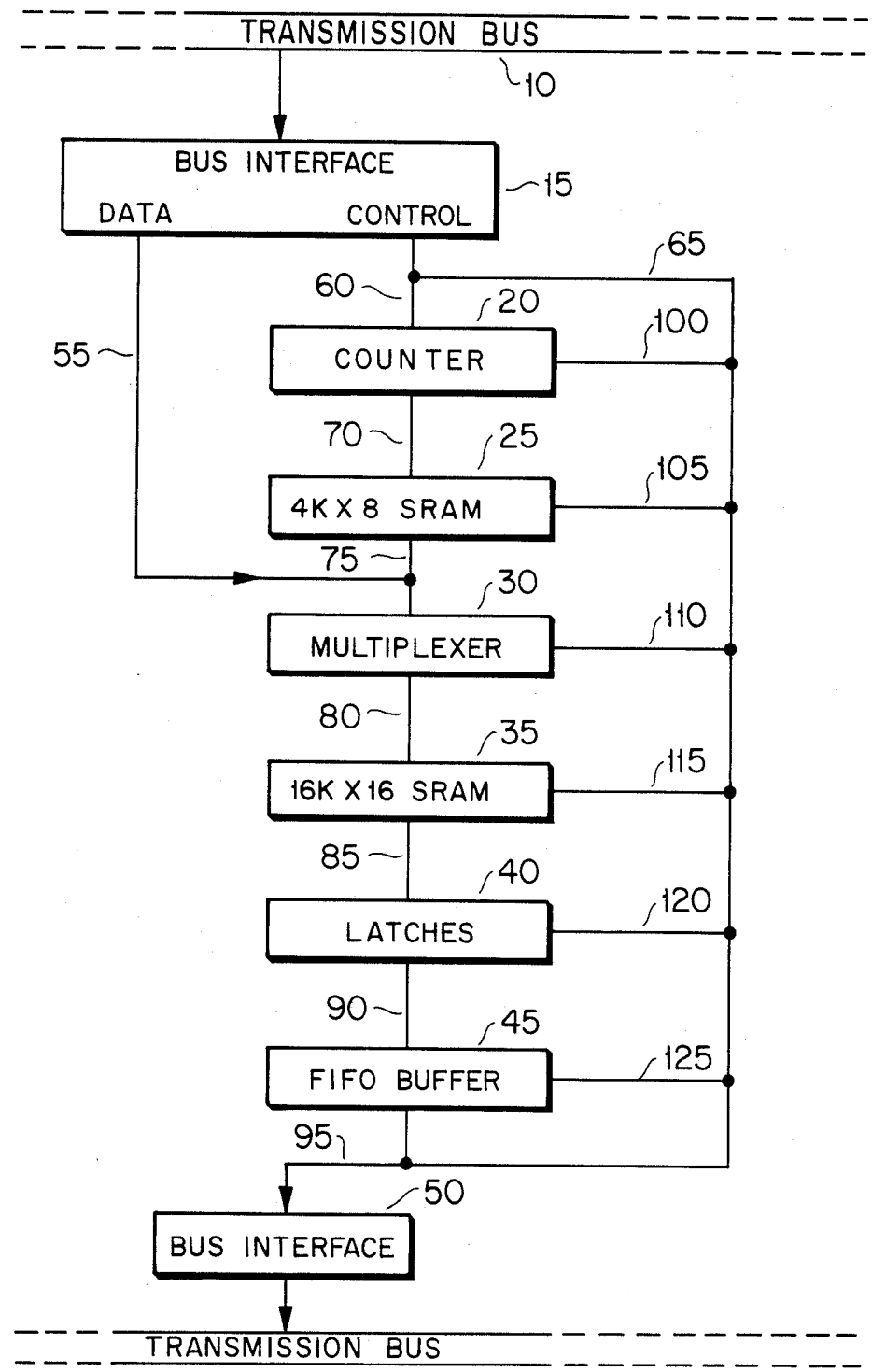
FIG. 12 is a schematic block diagram of the preferred embodiment of the present invention.

In FIG. 12, a complete schematic of the present invention is presented. Reference numeral 10 designates a system-bus on which data-sequence in byte-wide units are circulated past the present invention so that data-sequence, such as Ethernet packets pulled off a LAN bus, may be read and latched, one byte at a time. Pursuant to reading and latching functions performed by the system-bus-interface-unit 15 (containing standard components such as a system-bus-interface, latches, address comparator and a controller state machine), the bytes of a data-sequence are delivered, one byte at a time, via channel 55 through multiplexer 30 to the lower-order address-select lines of static random access memory (SRAM) 35 via channel 80. SRAM 35 is the COMP RAM.

Simultaneously, system-bus-interface-unit 15 generates clocked control signals over channels 60 and 65. The control signals coincide with the reading and latching of bytes of the system-bus-interface-unit so that control signals, one per byte, may be passed over control line 60 to binary counter 20 coincident with the passage of bytes over data channel 55.

Binary counter 20 is thereby clocked to increment by one with the delivery to the trap machine of each byte, hence counting the ordinal position of each byte in a sequence of bytes.

In addition, the current count value of the binary counter is delivered via counter-output lines 70 to the address-select lines of SRAM 25. SRAM 25 is the COUNT RAM. The count values of binary counter 20 thus directly correspond to COUNT RAM addresses at which pre-determined resident binary words are read. The COUNT RAM words thus accessed are output over COUNT RAM data-output lines via channel 75 through multiplexer 30 to the higher-order address-select lines of the COMP RAM via channel 80.

The controller state machine inside system-bus-interface-unit 15 is designed to issue control and/or clock signals over channels 60, 65, 100, 105 and 110 such that an individual byte and its corresponding COUNT RAM word arrive at the address-select lines of SRAM 35, the COUNT RAM, simultaneously so that individual bytes drive the lower-order address-select lines while their corresponding COUNT RAM words drive the higher-order address-select lines, respectively.

The data-byte-plus-COUNT-RAM signals thus delivered to the COMP RAM address-select lines access specific 16-bit words in the COMP RAM. Each COMP RAM word accessed in this manner is then output over the COMP RAM data-output lines via channel 85 to bank 40, consisting of 16 J-$\overline{\text{K}}$ flip-flops. There is one J-$\overline{\text{K}}$ flip-flop per COMP RAM data-output line or, equivalently, per bit of each COMP RAM word.

The J-$\overline{\text{K}}$ flip-flops are each initially set to true by control signals issued by system-bus-interface-unit 15 via channels 60, 65 and 120 before receipt of the first byte of a data-sequence. Thereafter, the individual bits of the COMP RAM words serve as the input signals to their respective individual J-$\overline{\text{K}}$ flip-flops. The J-$\overline{\text{K}}$ flip-flop circuit is designed so that once it is set to true, only a false input will flip it to a false state in which it will remain until it is externally reset to true, hence implementing the true-until-proven-false scheme discussed above.

After the last byte of a data-sequence, the system-bus-interface-unit receives an end-of-sequence signal generated by a separate device (disclosed in formerly co-pending application REAMES, entitled "Real-Time End of Packet Signal Generator" Ser. No. 798,054, filed Nov. 14, 1985, which has since issued as U.S. Pat. No. 4,680,755). Upon receipt of this signal, the system-bus-interface-unit sends control signals via channels 60, 65, 100, 105, 110 and 115 to counter 20, to the COUNT RAM, to MUX 30 and to the COMP RAM. During this last phase, the other half of SRAM 25, the COUNT RAM, drives the lower-five address-select lines of SRAM 35, the COMP RAM, while the remaining address-select lines are pulled high, thereby accessing the last segment of the COMP RAM. Whereas the most significant bit of counter 20 will control which half of the COUNT RAM is accessed, the bits to the right of the most significant bit will represent a number equal to the length in bytes of the data-sequence, prior to resetting of the COUNTER. Hence, based on this length number, certain pre-determined COUNT RAM address-select lines will be driven so that the COUNT RAM word appropriate to the particular length number will be accessed. This COUNT RAM word drives the lower-five address-select lines of the COMP RAM. The five address-select lines now driven by the COUNT RAM will point to one of seventeen addresses in the 64th segment of the COMP RAM, containing 16-bit words holding length information. If the received data-sequence is too short to satisfy any of the filters, then the word consisting of all false values is accessed. If the received data-sequence is long enough to satisfy all filters, then the word consisting of all true values is accessed. If the data-sequence satisfies the length criterion for one or more but not all of the filters, then one of the other 15 words is accessed, representing a pattern of true/false values, previously loaded by a microprocessor, corresponding to which filters are satisfied.

The appropriate COMP RAM length-check word thus accessed is then output via channel 85 to the 16 J-$\overline{\text{K}}$ flip-flops of bank 40. This word represents the final comparison cycle for that data-sequence. Any false bits in the word will flip their respective J-$\overline{\text{K}}$ flip-flop, provided the flip-flop was not already flipped during a previous bytecomparison cycle relevant to that data-sequence. At this point in time, the J-$\overline{\text{K}}$ flip flops finally hold 16-bit pattern of true/false values representing the results of filtering a single data-sequence. Each true bit, that is, J-$\overline{\text{K}}$ flip-flop, indicates that its respective filter was satisfied by the data-sequence.

Hence, pursuant to control signals sent from system-bus-interface-unit 15 via channels 60, 65 and 125, this final 16-bit result, holding the filtering results for a single data-sequence, may be latched from the 16 J-$\overline{\text{K}}$ flip-flops in bank 40 via channel 90 into the first-in-first-out (FIFO) buffer 45. The buffered results may then be latched (pursuant to control signals sent from system-bus-interface-unit 15 via channels 60, 65 and 125) from buffer 45 via channel 95 to other devices for their use via DIO bus interface circuitry 50.

I claim:

1. A digital data filter for filtering data-sequences of binary data-units travelling along a transmission medium, comprising:

reader-controller means for reading data-units of a data-sequence from the transmission medium for filtering, and for generating control signals;

a comparison-means, connected to said reader-controller means and having a plurality of segments, for storing in parallel user-defined filters to be applied to data-sequences read by said reader-controller means, and for generating output signals indicative of the results of said filtering;

memory-mapping means, connected to said comparison means, for counting the ordinal position of each data-unit of a data-sequence, and for generating output signals for mapping each data-unit as a function of its ordinal position onto a user-predetermined segment of said comparison means; and latch means, connected to said comparison means, for storing the output signals generated by the comparison means, wherein said latch means comprises a bank of electronic latches having one latch per filter of said comparison means, and each latch of said bank holds a single binary bit value, and each said latch is configured such that if said latch is externally set to true it will flip to false only on false input and will remain false until externally reset to true.

2. A digital data filter as in claim 1, wherein:

the comparison means comprises a random access memory configured into equi-sized segments of equi-sized binary words;

each segment is equal in length to one data-comparison parameter;

each segment holds as many data-comparison parameters in parallel as there are bits in said equi-sized binary words of said segments; and the segments taken as a whole constitute parallel sequences of data comparison parameters.

3. A digital data filter as in claim 2, wherein:

each said sequence of data comparison parameters constitutes a single filter such that the comparison means as a whole holds, in parallel, a number of filters which number is less than or equal to the number of bits in each equi-sized binary word of each segment; and each filter having a length in data comparison parameters less than or equal to the number of segments of said comparison means.

4. A digital data filter as in claim 1, wherein the memory mapping means comprises a binary counter and a random access memory.

5. A digital data filter as in claim 4, wherein the binary counter is clocked via control signals from said reader-controller means to increment with the reading of each data-unit of a data sequence such that the output of said counter consists of counter values corresponding to the ordinal positions of data-units in said data-sequence.

6. A digital data filter as in claim 5, wherein:

the output of said binary counter drives the address-select lines of said random access memory such that successive counter values access successive random access memory addresses; and resident at said addresses are user-predetermined pointers to said comparison means segments such that a given data-unit of a given data-sequence is mappable as a function of that data-unit's ordinal postion in that data-sequence onto a segment of said comparison means.

7. A digital data filter for filtering data-sequences of binary data-units travelling along a transmission medium, comprising:

reader-controller means for reading data-units of a data-sequence from the transmission medium for filtering, and for generating contol signals;

a comparison-means, connected to said reader-controller means and having a plurality of segments, for storing in parallel user-defined filters to be applied to data-sequences read by said reader-controller means, and for generating output signals indicative of the results of said filtering, wherein said comparison means comprises a random access memory configured into equi-sized segments of equi-sized binary words, and each segment is equal in length to one data-comparison parameter, and each segment holds as many data-comparison parameters in parallel as there are bits in said equi-sized binary words of said segments, and the segments taken as a whole constitute parallel sequences of data comparison parameters, wherein each said sequence of data comparison parameters constitutes a single filter such that the comparison means as a whole holds, in parallel, a number of filters which number is less than or equal to the number of bits in each equi-sized binary word of each segment, each said filter having a length in data comparison parameters less than or equal to the number of segments of said comparison means;

memory-mapping means, connected to said comparison means, for counting the ordingal position of each data-unit of a data-sequence, and for generating output signals for mapping each data-unit as a function of its ordinal position onto a user-predetermined segment of said comparison means; and latch means, connected to said comparison means, for storing the output signals generated by the comparison means.

8. A digital data filter for filtering data-sequences of binary data-units travelling along a transmission medium, comprising:

reader-controller means for reading data-units of a data-sequence from the transmission medium for filtering, and for generating control signals;

a comparison-means, connected to said reader-controller means and having a plurality of segments, for storing in parallel user-defined filters to be applied to data-sequences read by said reader-controller means, and for generating output signals indicative of the results of said filtering;

memory-mapping means, connected to said comparison means, for counting the ordinal position of each data-unit of a data-sequence, and for generating output signals for mapping each data-unit as a function of its ordinal position onto a user-predetermined segment of said comparison means wherein said memory-mapping means comprises a binary counter and a random access memory wherein the binary counter is clocked via control signals from said reader-controller means to increment with the reading of each data-unit of a data sequence such that the output of said counter consists of counter values corresponding to the ordinal positions of data-units in said data-sequence; and latch means, connected to said comparison means, for storing the output signals generated by the comparison means.

9. A digital data filter as in claim 8, wherein:

the output of said binary counter drives the address-select lines of said random access memory such that successive counter values access successive random access memory addresses; and resident at said addresses are user-predetermined pointers to said comparison means segments such that a given data-unit of a given data-sequence is mappable as a function of that data-unit's ordinal position in that data-sequence onto a segment of said comparison means.

* * * * *